Aug. 6, 1957  H. S. CAMPBELL  2,801,550
OSCILLATING APPARATUS AND CONTROL THEREFOR
Filed May 24, 1956  3 Sheets-Sheet 3

INVENTOR.
HARRIS S. CAMPBELL
BY
ATTORNEYS

United States Patent Office 2,801,550
Patented Aug. 6, 1957

2,801,550

OSCILLATING APPARATUS AND CONTROL THEREFOR

Harris S. Campbell, Bryn Athyn, Pa., assignor to the United States of America as represented by the Secretary of the Air Force Application May 24, 1956, Serial No. 587,182

12 Claims. (Cl. 74—600)

The present invention relates to apparatus for inducing oscillating motions and is concerned more particularly with an improved structure and control mechanism therefor.

For test purposes and the like it is often desirable to induce in equipment oscillating motions for such purposes as to study the critical vibration conditions inherent in the structure of the device being tested or for operating the apparatus at a point near its critical frequency for the purpose of inducing higher than normal stresses to provide accelerated tests conditions. In equipment for this purpose it is desirable that the range of frequencies available should be readily adjustable to cover the required operational range and that the amplitude of oscillating motion should be adjustable in order to impart the desired amount of energy into the exciting action.

One example of the use of such equipment is in the testing of helicoptor rotors on a test stand. During operation of the test rotor it may at times be desirable to induce periodic pitch motions in the blades as they are being rotated. By connecting the oscillating apparatus of the present invention to the swash plate of the rotor control system periodic pitch changes may be applied to the rotor blades. By changing the frequency of oscillation the operational range may be surveyed to determine critical conditions of vibration. If desired the exciter unit may be oscillated at a selected frequency close to a critical frequency in order to induce greater than normal vibrations to produce increased operational stresses for test purposes. By changing the amplitude during running, the amount of pitch change may be varied as desired. With such a sysem large loads may be induced in the oscillating mechanism because of the inertia forces developed by the parts being oscillated.

It is a primary object of this invention to provide an improved structure for supporting and controlling the crank device used to supply the oscillating motions. The structure used for mounting the crank to permit change in crank eccentricity provides adequate support against the inertia loads developed and the adjusting mechanism is constructed to provide accurate retention of the crank in any position of adjustment.

It is a further object of the invention to provide means for accomplishing the position adjustment of the crank which may be operated during running of the oscillating equipment and controlled from a remote position such as the operator's location at the base of the test tower in the case of the use of the equipment with a helicopter rotor test stand.

Another object of the invention is the provision of crank position indicating mechanism which is arranged to show the position of the eccentricity of the crank and thus give a direct reading of the amplitude of motion of the oscillating mechanism at all times.

A still further object of the invention is the provision of crank pin positioning mechanism to which power may be applied for changing the crank eccentricity and thus the oscillating amplitude.

Other objects and advantages of the invention will become apparent from the following detailed description of one embodiment thereof, taken in conjunction with the accompanying drawings, in which.

Figure 1:
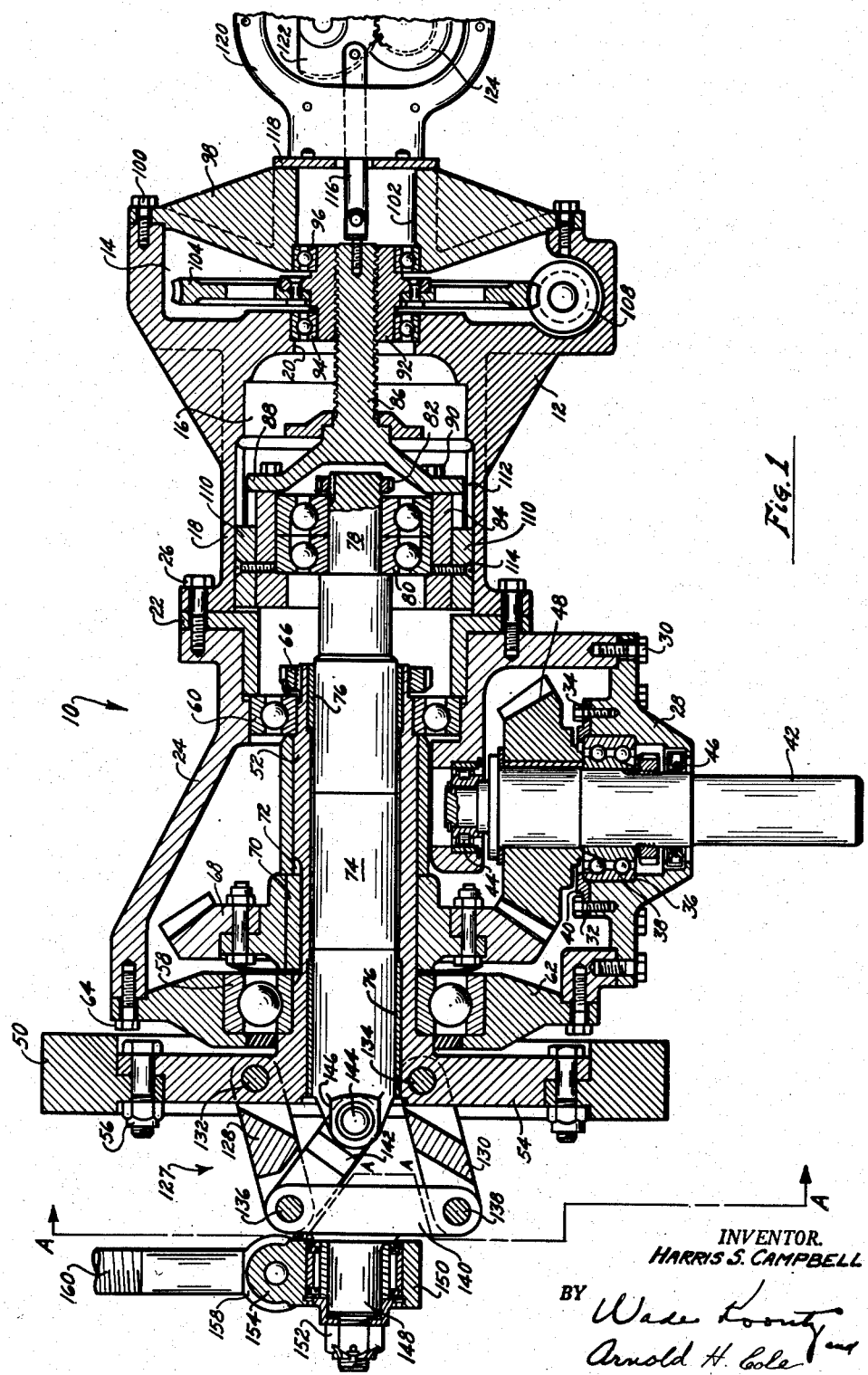
Fig. 1 is a sectional view through the drive and control apparatus of my invention.

Referring now to the drawings in which like characters of reference indicate like parts, the improved oscillating apparatus comprises a housing generally designated at 10. A casing section 12 forms one end of housing 10. The section is recessed at its outer end to form a chamber 14, and another chamber 16 is formed by the inwardly extending, flanged wall 18 of section 12. A central bore 20 in section 12 connects the chambers 14 and 16. An annular spacer 22 abuts flanged wall 18. Another casing section 24 in turn abuts said spacer. A plurality of headed screws 26 pass through the flange on wall 18 and spacer 22 and then into tapped bores in section 24 to hold the several parts in assembled relationship.

Mounted on one portion of casing section 24 is an apertured plate 28. Screws 30 pass through bores in a flange on said plate and are held in tapped holes in section 24. A second, and smaller, apertured plate 32 is held on one side of plate 28 by screws 34. The aperture through plate 28 is formed with three stepped shoulders. The innermost shoulder 36 carries a ball bearing assembly 38, said assembly being held in place by a flange 40 on the plate 32.

A motor driven, power input shaft 42 is rotatably journaled in the bearing assembly 38. The shaft extends through plate 28, and the innermost end of said shaft co-operates with a roller bebaring assembly 44 carried by a portion of the casing section 24. A shaft seal 46 rests on one of the other shoulders formed within the aperture in plate 28 and engages the shaft 42. Between bearing 38 and 44, the shaft 42 is provided with a bevel gear 48 mounted for rotation with said shaft.

When shaft 42 drives bevel gear 48 the motion is transmitted to a flywheel structure. This structure includes a rim 50 and a sleeve portion 52, the latter having an externally extending flange 54. Rim 50 is fixed to said flange by any conventional means, nuts and bolts being shown at 56 in Figs. 1 and 2. The sleeve portion 52 is rotatably mounted in a pair of ball bearing assemblies 58 and 60. The bearing assembly 58 is held in place by a retainer ring 62 secured at its periphery to section 24 by screws 64. The spacer 22 and the casing section 24 co-operate to hold assembly 60 in position. The end of sleeve portion 52 is externally threaded and receives a lock nut 66. Adjustment of the nut 66 eliminates undesirable lateral movement of the flywheel structure.

A second bevel gear 68 is mounted on sleeve section 52 between bearing assemblies 58 and 60. Said gear and section are prevented from relative rotation by means of a key 70 on the former riding in a key slot 72 on the latter. The gears 48 and 68 are in driving engagement whereby rotation of shaft 42 is transmitted to the flywheel structure.

Within the central bore of the sleeve section 52 is a control rod 74. The latter rotates with the flywheel structure through co-operation with a pair of bearing sleeves 76 which are fitted into recesses at opposite ends of the wall of said bore. One end of the control rod 74 extends into chamber 16 in casing section 12. Said end of the rod is reduced at 78 to form a shoulder. A ball bearing assembly 80 is carried on the control rod. One side of said assembly is held between the aforesaid shoulder and a lock nut 82 threaded on said rod. The other side of said assembly abuts a control sleeve 84. a jackscrew 86 has a flared, flanged end 88 which is fixed to the control sleeve by screws 90. The threaded stem of said jackscrew extends through the central bore 20 of casing section 12 and into chamber 14. The threaded stem of jackscrew 86 engages the internally threaded bore of a nut 92. This nut is journaled for rotation in a pair of ball bearing assemblies 94 and 96 which engage shoulders on opposite ends of said nut. A recess in the wall of central bore 20 holds assembly 94. An annular cover plate 98 is attached to the casing section 12 by screws 100, and the central bore 102 of said plate is recessed to receive assembly 96. By thus fixing the bearing assemblies 94 and 96 in the recess, reciprocation of nut 92 is prevented.

Figure 3:
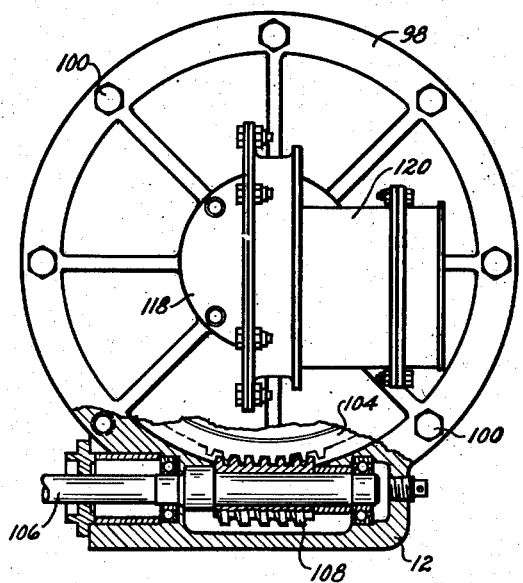
Fig. 3 is an end view partially in section of the selsyn end of the oscillating apparatus.

Inside chamber 14 is a worm wheel 104 which is fixed to a peripheral flange on nut 92. As more clearly seen in Fig. 3, a drive shaft 106 enters chamber 14 in casing section 12 and a worm gear 108 is carried thereon. Gear 108 meshes with the worm wheel 104 whereby rotation of the drive shaft 106 causes proportionate rotation of the worm wheel and, consequently, the nut 92. Rotation of nut 92 results in reciprocation of the jack screw and the control sleeve 84. Rotation of these latter members is prevented by keys 110 riding in keyways 112 formed in the walls 18 of casing section 12. The keys are mounted on the control sleeve 84 by screws 114.

Figure 5:
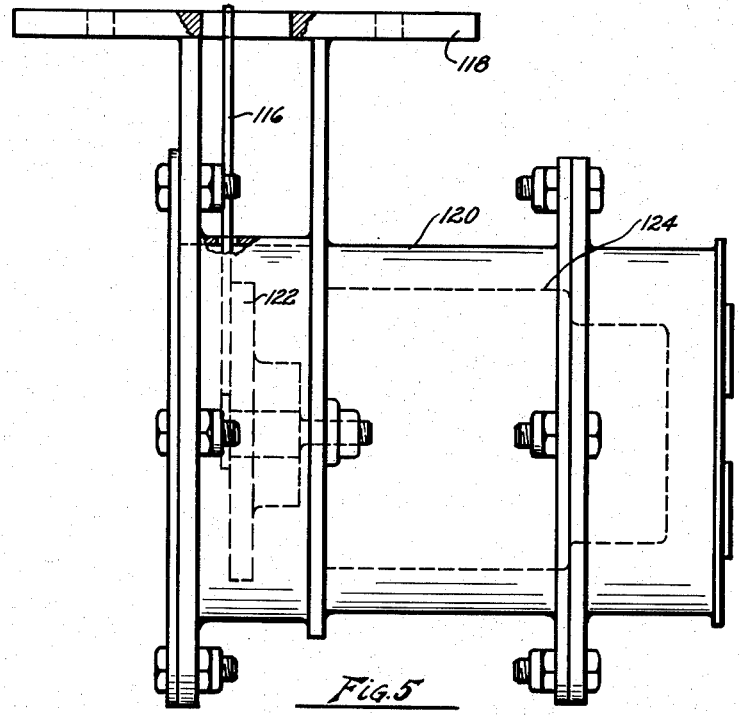
Fig. 5 is a top plan view of the selsyn housing partially shown in Fig. 3.

In order to give an indication of the position of the jackscrew 86, a link 116 is pivotally connected to the threaded stem thereof. The link passes through an opening in a mounting plate 118 attached to the cover plate 98. An indicator housing 120, see Fig. 5, is carried by the plate 118, and the link 116 is received therein. Within the housing 120 the link is connected to a sector gear 122. A selsyn transmitter 124 is operated by said gear, and the signal transmitted thereby may be read from a selsyn receiver 125 located on a control board 126. Receiver 125 is preferably calibrated to give a direct reading of the displacement of the oscillating device.

Figure 6:
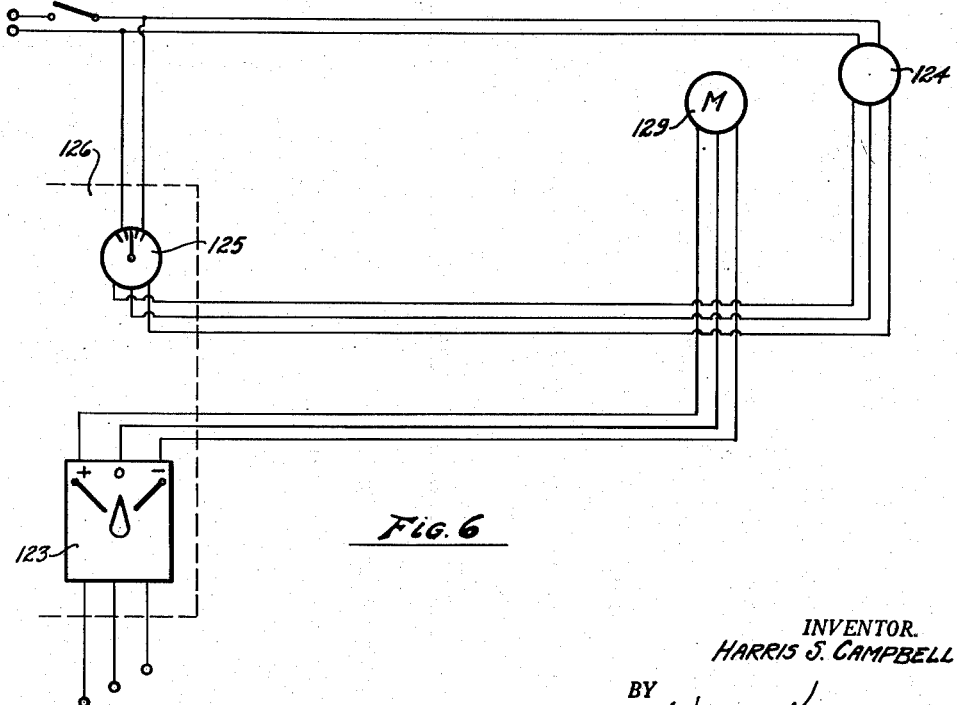
Fig. 6 is a wiring diagram of the position indicating the control system.

The board 126 is shown in broken lines in Fig. 6. A switch 123 controlling the driving motor 129 for the worm gear 108 is situated adjacent the receiver 125 for convenience of the operator.

Returning to the crank end of the oscillating mechanism, a linkage system, generally indicated at 127, is mounted on the flange 54 of the flywheel structure. The system comprises a pair of parallel links 128 and 130, pivoted to said flange at 132 and 134, respectively. Pivoted at 136 and 138 between the opposite ends of each of said links is a third link 140. A control link 142 also has one of its ends pivoted at 136. The opposite end of said control link is pivotally connected at 144 between protruding ears 146, see Fig. 2, on the control rod 74. When the control rod 74 is moved longitudinally, the control link 142 transmits a component of such motion to the link 140 through the pivot 136. This latter link is moved on an axis normal to that of the rod 74. The parallel links 128 and 130 are thus moved about pivots 132 and 134, and through the medium of link 140 their parallel relationship is undisturbed.

Figure 4:
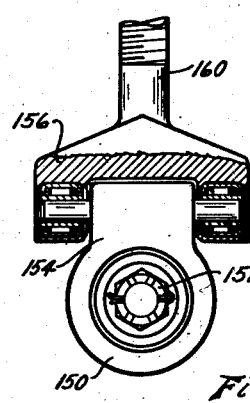
Fig. 4 is an end view partially in section of the rod end at the oscillating crank.

A crankpin 148 is formed on and extends outwardly from the link 140. A cover assembly 150 is held in position over said crankpin by a nut 152. Extending from the assembly 150 is an upstanding bracket 154. Said bracket is attached to a yoke 156 in such a manner that a universal connection 158 is formed therebetween. The yoke 156, see Fig. 4, carries a rod 160 which transmits the oscillating motion developed by the rotation of crankpin 148 when it is in eccentric position.

The oscillating apparatus described above will operate in the following manner. Assuming the parts to be in the positions shown in Fig. 1, the motor for drive shaft 42 is started. As shaft 42 rotates, bevel gear 48 thereon coacts with bevel gear 68 which is keyed to the flywheel structure. As the flange 54 of said structure rotates, the linkage system 127 also rotates, as does the crankpin 148. However, since the axes of the crankpin and the flywheel structure coincide in Fig. 1, the arm 160 is not reciprocated, and no cyclic motion is produced.

Now if the worm gear 108 is rotated, it drives worm wheel 104 and the attached nut 92. Since said nut is held against lateral movement, its threaded bore coacts with the threaded stem of jackscrew 86 to axially move the latter in a direction dependent upon the direction in which the gear 108 is rotated. Such motion of the jackscrew is transmitted to the control rod 74 through the control sleeve 84 and the bearing assembly 80. Said motion is also transmitted through link 116 and sector gear 122 to the selsyn assembly 124—125. The degree and direction of motion will thus be clearly indicated to an operator at the control board.

Figure 2:
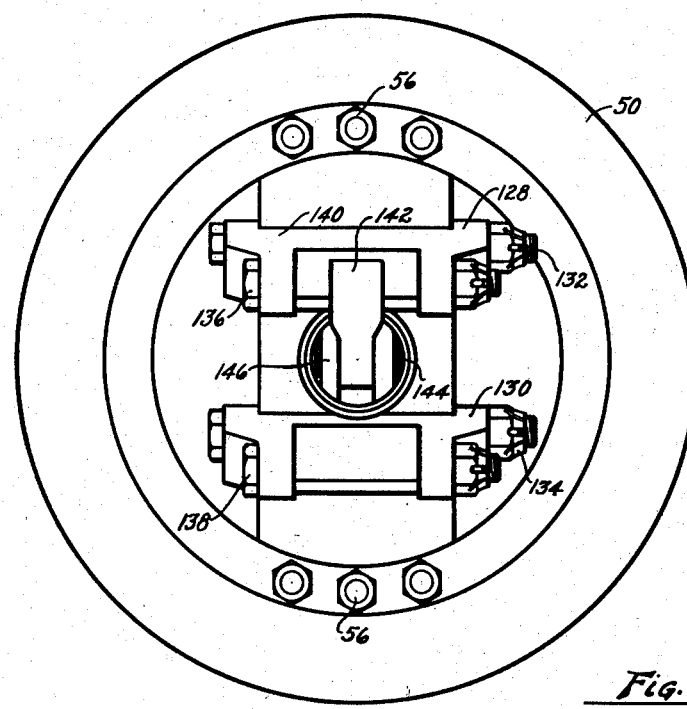
Fig. 2 is an end view of the parallel linkage system taken on the line A—A—A—A in Fig. 1.

If the control rod 74 is moved to the right, as seen in Fig. 1, driving link 142 will cause the parallel links 128 and 130 to move downward around pivots 132 and 134. This in turn will cause downward movement of link 140 and crankpin 148. With the parts in this new position, rotation of the crankpin by the flywheel structure will result in the former following an eccentric orbit relative to its original axis. Arm 160 will accordingly be reciprocated to impart a corresponding oscillating motion having a frequency equal to the rotational speed of the crank. When the desired amplitude of oscillation, which is equal to twice the eccentricity of crankpin 148, is indicated to the operator, the drive motor 129 for gear 108 is cut off. Further adjustment of the amplitude within the limits of travel may be made by following the above procedure, motor 129 being reversible by selective use of switch 123.

While the machine is in operation, there is a constant supply of power to the driving motor for shaft 42. Therefore, the flywheel structure is constantly being rotated. Since the control rod 74 is fitted so as to rotate with sleeve section 52, the motion of shaft 42 is constantly being transmitted to the crankpin through linkage system 127. By means of my invention, in which rod 74 may be adjusted in the sleeve section, amplitude adjustment of the crankpin may be readily achieved while the apparatus is being continuously driven. The switch 123 for operating the worm gear should be positioned adjacent the selsyn receiver to produce both simple and accurate control. In actual construction the end casing section 12 can be rotated 90° about its axis so that the shafts 42 and 106 are in parallel relationship. This construction facilitates connection to the respective drives.

From the foregoing description it will be clear that my improved oscillating apparatus provides a robust adjustable crank construction capable of withstanding heavy loads in any position of adjustment without deformation. By the use of the bevel gear drive the crank may be rotated at any desired speed by employing an adjustable speed motor to drive the input shaft 42. This drive system permits the mounting of a hollow crank shaft inside which the control rod for crank displacement may be mounted for sliding movement with respect to said crank shaft. Actuating the adjusting rod through the medium of the threaded nut and the worm gear mechanism provides an irreversible adjusting device which may be controlled through the medium of the reversible motor. Such a motor may be controlled from a remote operator's position such as described in connection with the use of the present device with the test tower operation of a helicopter rotor. The use of a selsyn indicator for showing the position of the adjusting rod allows the exact crank eccentricity and thus the amplitude of oscillation of the apparatus to be indicated at the operator's position with minimum installation difficulty.

What is claimed is:

1. A device for imparting cyclic motions comprising a rotatable hollow shaft member, means for rotating said member, rod means fitted within said member and extending therethrough, the fit being such that said rod means is slidable longitudinally relative to said member, a crankpin, linkage means connecting the crankpin to both said shaft member and said rod means whereby rotation of the shaft member causes rotation of said crankpin and longitudinal adjustment of said rod means changes the degree of eccentricity of said crankpin.

2. A device as defined in claim 1, including gear means connected to said rod means for adjustment thereof, and means for constantly indicating the adjusted position of said rod means.

3. A device as defined in claim 2 wherein the gear means comprise co-operating rotary gear elements, a nut fixed against axial movement and connected to one of said elements, and externally threaded means coacting with an internally threaded bore in said nut, the threaded means being attached to the rod means whereby rotation of the gear elements and nut are translated into axial motion of the threaded means and the rod means.

4. A device as defined in claim 3 wherein the indicating means comprises a selsyn transmitter and receiver, the former being actuated by the threaded means through a connection between said transmitter and the last named means.

5. A control mechanism for imparting a variable amplitude to a member comprising a crank supporting structure, a rod extending centrally through said structure and being axially movable with respect thereto, a parallel linkage means having portions thereof attached to both the rod and the structure for movement therewith, a crank device mounted on said linkage means, a drive means for rotating said structure and consequently said rod, a second drive means for axially moving said rod while it rotates with the structure, and an operating arm connected to said crank device for transmitting motion thereof to a member to be controlled.

6. The mechanism defined in claim 5 wherein the linkage means includes a pair of parallel links connected to the crank supporting structure, a rigid link connecting said parallel links, and an adjustment link connected between said rod and said rigid link.

7. The mechanism defined in claim 6 wherein the crank device is connected to said rigid link, and means are provided for indicating the axial position of said rod which in turn determines the orbit of the crank device.

8. A device for developing a controlled oscillating motion including a housing, a shaft supported in said housing and having a first end portion, a crank structure movably connected to said end portion, a control rod supported concentrically in said shaft for axial movement with respect thereto, a connecting link between said crank structure and said control rod, a bevel gear drive attached to said shaft, said control rod extending through said shaft and out an end of the shaft opposite to said first end portion, a threaded rod member connected to said control rod and a co-acting nut member mounted only for rotation in said housing, a position indicator device attached to said threaded rod member to move longitudinally therewith, said rod member having means engaging said housing to prevent rotational movement with respect thereto.

9. The construction in accordance with claim 8 in which a worm wheel is attached to said nut member and a worm is supported in said housing in engagement with said wheel.

10. An exciter device for developing a controlled oscillating motion including a housing, a shaft rotatably supported in said housing and having a terminal portion, a crank device supported externally of said housing, said crank device also including a terminal portion, a pair of parallel link members pivotally connected to the terminal portion of said shaft at one end and to the terminal portion of said crank device at the other end, a control rod supported concentrically in said crank shaft for axial movement with respect thereto, a connecting link pivotally connected to said control rod and to said block portion of the crank device thereby providing for adjustment of the crank device position with respect to the shaft.

11. A construction as defined in claim 10 wherein a threaded rod is connected by a rotational joint to the end of said control rod near the opposie end of said shaft from said terminal portion, said threaded rod having restraining means connected to said housing to prevent rotation of said threaded rod with respect thereto, a threaded nut member engaging said threaded rod, said threaded nut member being rotatably supported in said housing, a worm wheel connected to said nut member and a worm engaging said worm wheel for rotational adjustment thereof.

12. A construction as defined in claim 11 having a member connected to said threaded rod for axial movement therewith, said last mentioned member having an operating connection to a position indicating device.

<center>No references cited.</center>